United States Patent
Martin et al.

(10) Patent No.: US 6,308,196 B1
(45) Date of Patent: *Oct. 23, 2001

(54) METHOD AND INTERFACE DEVICE FOR SHARING PHYSICAL RESOURCES

(75) Inventors: Jean-Noël Martin, Montfort; Anthony Barrandon, Guichen; Serge Schiano, Versailles, all of (FR)

(73) Assignee: Alcatel Mobile Communication France, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/490,425

(22) Filed: Jun. 14, 1995

(30) Foreign Application Priority Data

Jun. 17, 1994 (FR) .................................................. 94 07437

(51) Int. Cl.[7] ................................ G06F 9/00; G06F 13/28
(52) U.S. Cl. ........................... 709/100; 709/310; 709/311; 709/313
(58) Field of Search ................................... 395/700, 425, 395/275, 200.6; 364/200; 345/326; 709/100, 101, 102, 103, 104, 108, 310, 311, 312, 313; 710/1, 2, 3; 707/10

(56) References Cited

U.S. PATENT DOCUMENTS

| | | | |
|---|---|---|---|
| 4,430,699 | * 2/1984 | Segarra et al. | 364/200 |
| 4,593,352 | * 6/1986 | Castel et al. | 364/200 |
| 4,706,212 | * 11/1987 | Toma | 364/900 |
| 5,018,060 | * 5/1991 | Gelb et al. | 364/200 |
| 5,235,687 | * 8/1993 | Bacot et al. | 395/425 |
| 5,295,265 | * 3/1994 | Ducateau et al. | 395/650 |
| 5,432,910 | * 7/1995 | Barker et al. | 395/275 |
| 5,502,834 | * 3/1996 | Arata et al. | 395/496 |
| 5,544,303 | * 8/1996 | Maroteaux | 345/326 |
| 5,586,323 | * 12/1996 | Koizumi et al. | 395/705 |

FOREIGN PATENT DOCUMENTS

| | | | | |
|---|---|---|---|---|
| 0067294 | * | 12/1982 | (EP) | G06F/15/16 |
| 0511437A1 | * | 4/1992 | (EP) | G06F/9/44 |

OTHER PUBLICATIONS

Alok Sinha; "Client–Server computing"; ACM online, vol. 35, No. 7; Jul. 1992.*

Aho, Alfred V. et al, "Principles of Compiler Design", 1977, Addison–Wesley Publishing Company, Reading, Massachusetts.

*Communications of the ACM,* vol. 35, No. 7, Jul. 1992, New York, US, pp. 77–98, Sinha, Alok, "Client–Server Computing".

* cited by examiner

Primary Examiner—Majid A. Banankhah
(74) *Attorney, Agent, or Firm*—Sughrue, Mion, Zinn, Macpeak & Seas, PLLC

(57) ABSTRACT

In a method of sharing physical resources associated with a server system between the server system and a client system, a respective associated address designating a given location in a program memory and identifying the start of one of a plurality of tasks which access the physical resources is associated with the value assumed by a first parameter contained in a first field of the access request message. Respective values assumed by or associated with second parameters contained in a second field of the access request message with predetermined first locations are written in a data memory. The associated address is loaded into an execution register of the processor circuit in order to initiate the task. The steps of this method are implemented by an interface device and a program required for operation of the interface device is dissociated from each task of the plurality of tasks.

6 Claims, 2 Drawing Sheets

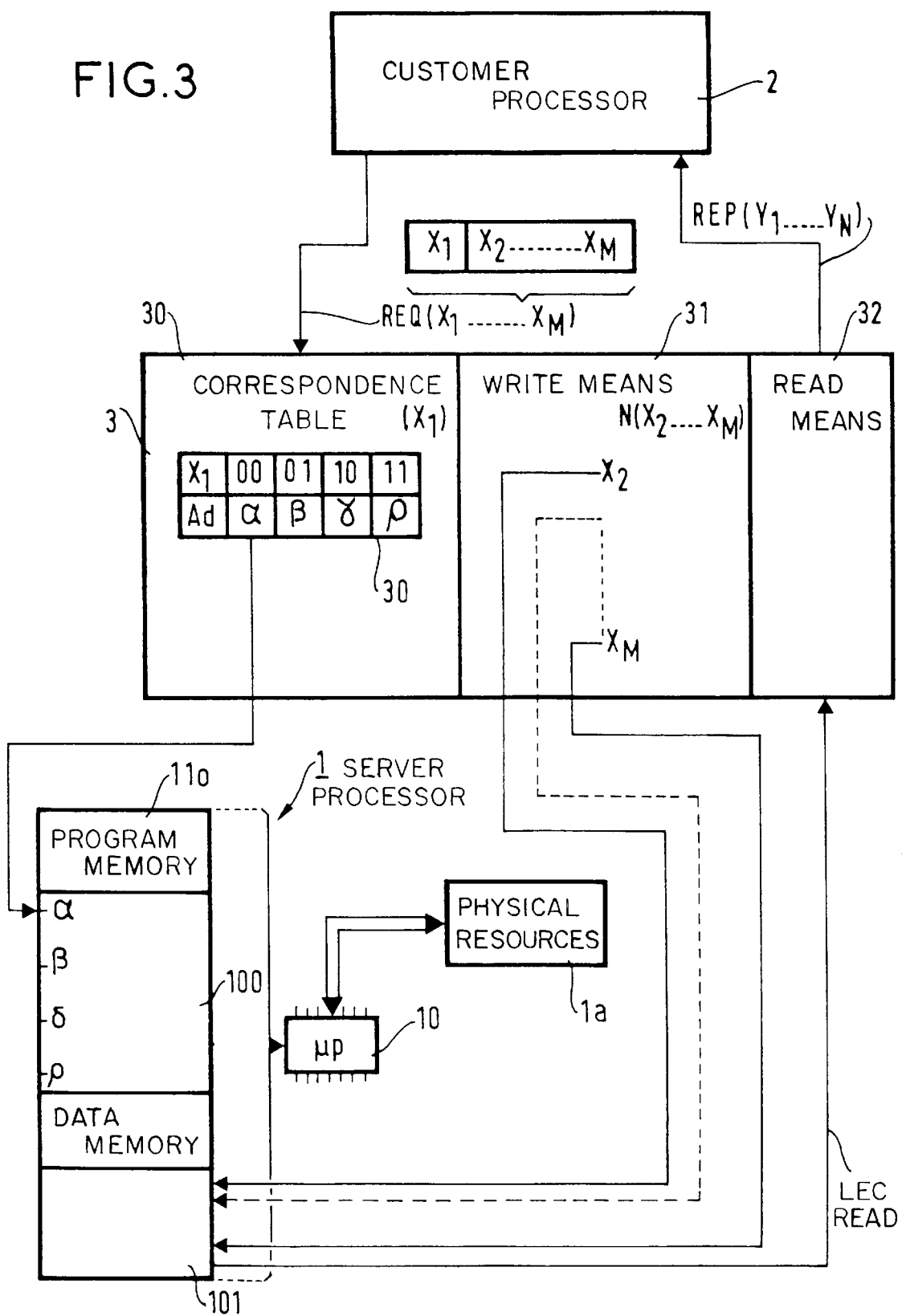

METHOD AND INTERFACE DEVICE FOR SHARING PHYSICAL RESOURCES

BACKGROUND OF THE INVENTION

1. Field of the Invention

The present invention is generally concerned with client-server type data processing architectures. In architectures of this kind a first processor called the server is connected to physical resources, for example an electrical control unit or a measurement unit, which are made available to one or more second processors, called clients, which are not connected directly to those resources.

The invention is more precisely concerned with sharing physical resources associated with a first processor between the first processor and one or more second processors. To simplify the remainder of the description, it is assumed that a single second processor shares physical resources with a first processor with which those resources are associated.

2. Description of the Prior Art

FIG. 1 shows the first and second processors 1 and 2 in a highly schematic fashion although in one implementation both may be computers.

The first processor 1 is associated with physical resources 1a which are not directly accessible to the second processor 2. To obtain access to the physical resources 1a associated with the first processor 1, the second processor 2 sends to the first processor 1 a message REQ($X_1 \ldots X_M$) requesting access to said resources. The access request message REQ ($X_1 \ldots X_M$) includes M parameters $X_1 \ldots X_M$ defining the nature of the access to the required resources. After receiving this message and accessing the physical resources 1a via interface means, the first processor 1 send to the second processor 2 a response message REP($Y_1 \ldots Y_N$). This response message includes information relating to the result of the request to access the resources 1a sent by the second processor 2 via the first processor 1.

Consider, by way of example, the situation in which the physical resources 1a are in the form of an electrical control unit. It may then be assumed that the message REQ($X_1 \ldots X_M$) is a remote control message to activate an electrical device in accordance with predetermined activation information. The message REP($Y_1 \ldots Y_N$) then contains one or more numerical parameters defining the result of the remote control action(s) and provided by the electrical control unit 1a.

Obviously, depending on the nature of the access to the resources 1a, the respective numbers M and N of parameters ($X_1 \ldots X_M$) and ($Y_1 \ldots Y_N$) sent in the request message REQ($X_1 \ldots X_M$) and in the response message REP($Y_1 \ldots Y_N$) can have any values.

As shown in FIG. 2, the first processor 1 is typically a processor or a microprocessor 10, also referred to hereinafter as the "processor circuit", and a computer program 11s. The processor circuit and the program cooperate to control and monitor the physical resources in the form of a control unit 1a and to exchange data with the latter. The program 11s controlling the operation of the microprocessor 10 can be divided into separate subroutines or basic tasks activating the microprocessor 10 to execute respective specific functions concerning control and monitoring of the physical resources 1a.

In the prior art, when physical resources 1a are to be made available to a client processor 2, it is necessary to modify the source program 11s interfacing the first processor 1 to the physical resources 1a so that the processor 1 can accept messages REQ($X_1 \ldots X_M$) requesting access to the resources from the client processor 2. The program 11s, which is a source program in a high-level language, is initially modified to define all types of resource access request messages that the first processor 1 can receive to request access to the physical resources 1a. When all access request message types have been defined, it is then necessary to introduce (as shown in FIG. 2 in the dashed outline box 11') the computer language equivalents of all the "IF-THEN" alternatives for access to the physical resources conditioned by the values taken by the parameters ($X_1 \ldots X_M$) contained in the messages REQ($X_1 \ldots X_M$). These alternatives also define program jumps to predefined program addresses, as shown by the arrows on the lefthand side in FIG. 2.

This prior art solution has two major drawbacks.

Firstly it requires systematic reprogramming of the program in the server processor 1 when new types of access for new uses of the physical resources are defined. Secondly, it greatly increases the size of the program 11s when compiled, by addition of the additional program portion 11'.

The invention is directed to remedying the above drawbacks by providing a process which, for the purpose of sharing resources with a client processor, requires no modification of the program which, in cooperation with the microprocessor, manages the physical resources in the server processor. The invention also provides an interface device for implementing this method.

SUMMARY OF THE INVENTION

In one aspect, the present invention consists in a method of sharing physical resources associated with a first processor between said first processor and a second processor, said method including sending of a message requesting access to said resources from said second processor to said first processor, and said first processor including a processor circuit associated with a program memory and a data memory, which method comprises the steps of:
  associating with the value assumed by a first parameter contained in a first field of said access request message a respective associated address designating a given location in said program memory and identifying the start of one of a plurality of tasks which access said physical resources,
  writing respective values assumed by or associated with second parameters contained in a second field of said access request message with predetermined first locations in said data memory associated with said first processor, said predetermined first locations being such that said task accesses each of said first predetermined locations when it is executed, and
  loading said associated address into an execution register of said processor circuit included in said first processor in order to initiate said task,
said steps being implemented by an interface device and a program required for operation of said interface device being dissociated from each task of said plurality of tasks.

For an embodiment of the invention in which execution results are supplied by the task, there is provided the further step of:
  reading by said interface device of parameters resulting from execution of said task by said processor circuit and memorized at predetermined second locations in said data memory associated with said first processor to form a response message sent to said second processor, said reading step being implemented by said interface device in response to end of execution of said task.

In a multitasking environment the first and second processors are both associated with the same processor circuit.

The interface device is typically the result of execution of said program by said processor circuit associated with said first processor.

In another aspect, the present invention consists in an interface device for implementing the above method. The device receives said access request message from said second processor, cooperates with said first processor and comprises:

correspondence table means for associating with each value that said first parameter can assume a respective one of a plurality of addresses designating respective locations in said program memory, and means for successively addressing each of said predetermined first locations in said data memory and writing in corresponding relation thereto each of said respective second values assumed by said second parameters contained in said second field of said access request message.

Other features and advantages of the present invention will emerge more clearly from a reading of the following description given with reference to the appended drawings.

BRIEF DESCRIPTION OF THE DRAWINGS

FIG. 3 is a diagram showing the steps of the method of the invention.

DETAILED DESCRIPTION OF THE PREFERRED EMBODIMENT

Figure 1:
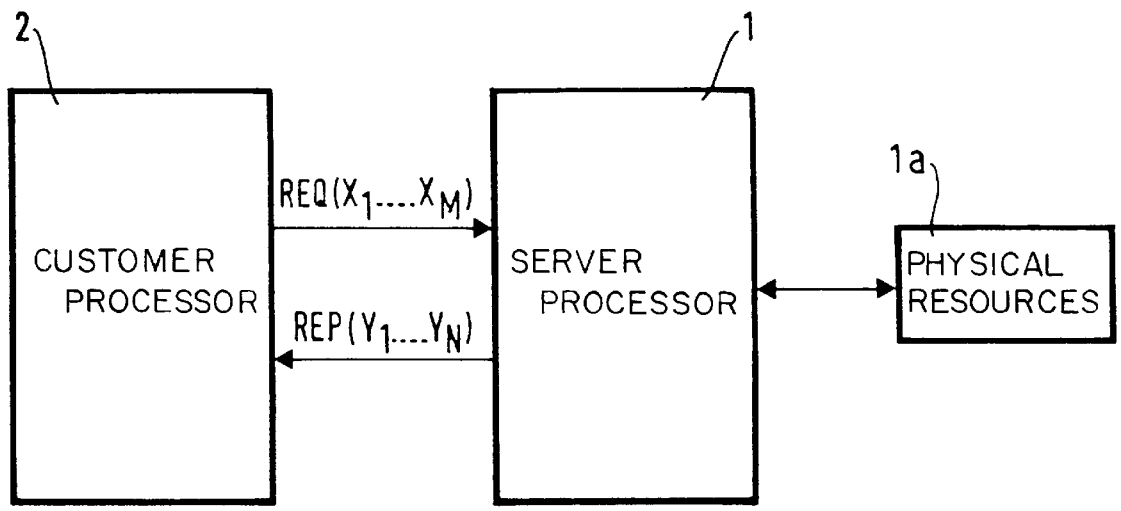
FIG. 1, already commented on, shows in highly schematic fashion two processors in a client-server type architecture.
Figure 2:
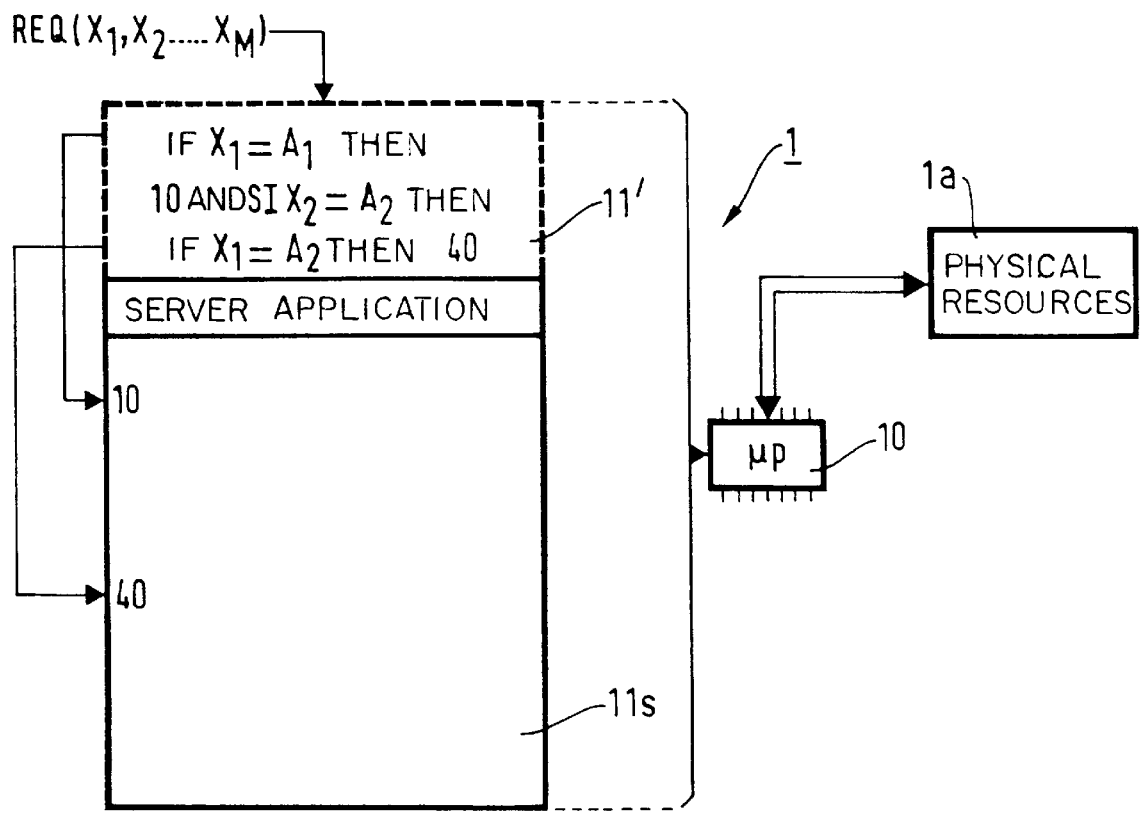
FIG. 2, also already commented on, shows a server-processor in the FIG. 1 architecture in more detail.

Referring to FIG. 3, the means for implementing the invention comprise a server processor or first processor 1, a client processor or second processor 2 and an interface device 3. The interface device 3 is in the form of a data processing program cooperating with a processor or a microprocessor. The data processing program forming part of the interface device 3 is separate from the programs (tasks) implemented in the first processor 1 which manage access to the physical resources connected to the first processor 1. The device 3 is also adapted to receive each message $REQ(X_1 \ldots X_M)$ requesting access to the resources sent by the second processor 2, to process the received messages in cooperation with the first processor 1 with the objective of accessing the physical resources associated with the latter, and to send the results of this access to the physical resources 1a to said second processor 2. A program may be provided for sequencing the processing of the access request messages and through which each access request message is received by the interface device 3. This sequencing program is adapted to communicate with the second processor to receive and store access request messages sent by the latter. The stored messages are then sent to the interface device described below. The interface device 3 may be in the form of a correspondence table 30, write means 31 and read means 32.

In a first step of the method of the invention, the second processor 2 sends a message $REQ(X_1 \ldots X_M)$ requesting access to the resources. This message can be conceptually divided into two separate data fields respectively containing the parameter $X_1$ and the parameters $X_2$ through $X_M$. The parameter $X_1$ in the first field identifies a specific task in the compiled or object program 11o that manages the physical resources 1a. For example, and assuming that the physical resources 1a are in the form of an electrical control unit, this task can be one of a plurality of tasks controlling an electrical device connected to the control unit. The parameters $X_2$ through $X_M$ in the second field are respective parameter values needed for execution of said task.

As shown in FIG. 3, the first processor 1 managing the physical resources 1a includes a processor circuit or microprocessor 10 associated with a program memory 100 and a data memory 101. The data memory is known to the person skilled in the art as a "stack". The program memory 100 stores the compiled form of the program that manages the physical resources 1a and that is executed by the processor or microprocessor 10. The program memory 100 is divided into a plurality of memory areas storing respective tasks for management of the physical resources 1a. Each of these memory areas is defined by an entry point (task start address). The data memory 101 stores data needed for executing each task of said program. The processor circuit 10 accesses the data stored in the memory 101 on execution of the program stored in the program memory 100.

The use of the interface device 3 in accordance with the invention is as follows: the message $REQ(X_1 \ldots X_M)$ requesting access to the physical resources 1a produced by the second processor 2 is received by the interface device 3, where applicable via the sequencing program referred to above. The parameter $X_1$ from the first field is processed using the correspondence table 30 of the interface device 3 of the invention. The correspondence table 30 associates the parameter $X_1$ with an address (entry point) designating the start location of a given memory area in the program memory 100. In FIG. 3, and by way of example, it is assumed that the parameter $X_1$ takes one of four binary values 00, 01, 10, 11. These four values are associated via the correspondence table 30 with respective addresses $\alpha$, $\beta$, $\delta$ and $\rho$ in the program memory 100. These four addresses designate entry points of respective basic tasks constituting specific processing operations concerning access to the physical resources 1a.

The parameters $X_2$ through $X_M$ from the second field of the access request message $REQ(X_1 \ldots X_M)$ are processed by the write means 31 which write at respective locations in the data memory 101 the respective values taken by the parameters $X_2$ through $X_M$. These values of the parameters $X_2$ through $X_M$ are written at respective predetermined locations in the stack 101 that correspond to locations subsequently accessed by an invoked task when it is executed. Note that the values written in the stack 101 need not correspond directly to the values taken by the parameters $X_2$ through $X_M$. In this case, means are provided for associating with each value taken by a parameter $X_2$ through $X_M$ a value to be stored in the stack. After the values taken by the parameters $X_2$ through $X_M$, or the values associated therewith, are stored in the stack, the address produced by the correspondence table, in this instance assumed equal to $\alpha$ ($X_1$=00), is loaded into an execution register of the microprocessor 10 which then executes the task defined by the instructions stored in the memory area starting at the address $\alpha$ in order to access the physical resources 1a. This task uses the values previously written in the stack 101.

One result of execution of this task by the microprocessor 10 to access the physical resources 1a is that the parameter (s) resulting from the access requested by the processor 2 are stored conventionally in the data memory 101 at predetermined locations, depending on the program. Also, when the task executed by the microprocessor 10 to access the physical resources is completed, the address of the last instruction of the program forming the interface device 3 that initiated said task is returned to the execution register of the microprocessor 10. This initializes a part of the program constituting the interface device 3 which forms the read means 32.

The read means 32 in the interface device 3 read the respective contents of predetermined locations which store the parameters ($Y_1$ through $Y_N$) and form the message REP($Y_1 \ldots Y_N$). This message REP($Y_1 \ldots Y_N$) is sent to the second processor 2. Note that the read means 32 are not needed for a first variant of the invention in which the task invoked does not return any parameters $Y_1$ through $Y_N$ to the client processor 2.

Accordingly, access by the second processor 2 to the physical resources 1a associated with the first processor 1 is requested without any modification to the source language program 11s by the addition of additional instructions.

In practise, it may be assumed that the task executed to access the physical resources does not return any parameters $Y_1$ through $Y_N$. In this case the read means 32 are not used. Also, the microprocessor forming part of the interface device 3 is typically that of the server processor 1.

In the embodiment of the invention as described above, it is assumed that the first and second processors 1 and 2 are physically separate and associated with separate processor circuits or microprocessors. The person skilled in the art will understand that the first and second processors 1 and 2 could be combined, for example in the context of a multitasking environment, in which case said first and second processors 1 and 2 define independent processes of which one, namely that defining the first processor 1, manages the physical resources 1a. Also, the person skilled in the art will understand that each memory location can be addressed indirectly, in which case an address designating a location identifies an intermediate location storing the address of the former location.

There is claimed:

1. Method of sharing physical resources associated with a first processor between said first processor and a second processor, which method comprises the steps of:

selecting, by said second processor, one of a plurality of tasks, wherein said plurality of tasks are predefined by a program in a program memory of said first processor;

providing an interface unit including a plurality of predetermined addresses each indicating a given task start location in said program memory for a corresponding one of said plurality of tasks;

sending an access request message from said second processor to said interface unit, said access request message including a first parameter value corresponding to said selected one of said plurality of tasks and including one or more second parameter values;

associating, by said interface unit, said first parameter value with one of said plurality of predetermined addresses to define an associated address, said associated address indicating said given task start location for said selected one of said plurality of tasks;

writing, by said interface unit, values corresponding to said second parameter values in predetermined first locations in a data memory of said first processor;

loading said task start location indicated by said associated address into an execution register of a processor circuit of said first processor to initiate said selected one of said plurality of tasks; and accessing, by said selected one of said plurality of tasks, each of said predetermined first locations.

2. Method according to claim 1 further comprising the step of:

reading, by said interface device, of parameters resulting from execution of said selected task by said processor circuit and memorized at predetermined second locations in said data memory, to form a response message sent to said second processor, said reading step being implemented by said interface device in response to end of execution of said selected task.

3. Method according to claim 1 wherein said first and second processors are both associated with the same processor circuit.

4. Method according to claim 1 wherein said interface device is the result of execution of said program by said processor circuit associated with said first processor.

5. Interface device for implementing the method according to claim 1, adapted to receive said access request message from said second processor and to cooperate with said first processor, said device comprising:

correspondence table means for associating with each value that said first parameter can assume a respective one of a plurality of addresses designating respective locations in said program memory, and means for successively addressing each of said predetermined first locations in said data memory and writing in corresponding relation thereto each of said respective second values assumed by said second parameters contained in said second field of said access request message.

6. Interface device for implementing the method according to claim 2, adapted to receive said access request message from said second processor and to cooperate with said first processor, said device comprising:

correspondence table means for associating with each value that said first parameter can assume a respective one of a plurality of addresses designating respective locations in said program memory, and means for successively addressing each of said predetermined first locations in said data memory and writing in corresponding relation thereto each of said respective second values assumed by said second parameters contained in said second field of said access request message; and means for reading in said data memory said parameters resulting from execution of said selected task by said processor circuit and for forming said response message sent to said second processor.

* * * * *